(12) United States Patent
Kumar et al.

(10) Patent No.: US 9,680,732 B2
(45) Date of Patent: Jun. 13, 2017

(54) IDENTIFYING INFLUENCE PATHS IN A COMMUNICATION NETWORK

(71) Applicant: Telefonaktiebolaget L M Ericsson (publ), Stockholm (SE)

(72) Inventors: N Hari Kumar, Chennai (IN); Ranjani Balakrishnan, Chennai (IN); Vikas Verma, Chennai (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 187 days.

(21) Appl. No.: 14/337,952

(22) Filed: Jul. 22, 2014

(65) Prior Publication Data

US 2016/0028614 A1    Jan. 28, 2016

(51) Int. Cl.
*H04L 12/721*     (2013.01)
*H04L 12/24*      (2006.01)
*H04L 12/733*     (2013.01)

(52) U.S. Cl.
CPC ............ *H04L 45/123* (2013.01); *H04L 41/12* (2013.01); *H04L 45/122* (2013.01); *H04L 45/124* (2013.01)

(58) Field of Classification Search
CPC ... G06Q 10/00; H04L 12/1813; H04L 41/083; H04L 41/12; H04L 43/045
See application file for complete search history.

(56) References Cited

FOREIGN PATENT DOCUMENTS

EP    WO 2013/152815    * 10/2013    ............. G06Q 10/00

OTHER PUBLICATIONS

Hangal et al. "All Friends are Not Equal: Using Weights in Social Graphs to Improve Search," Jul. 25, 2010, ACM.*
Hangal, S., et al., "All Friends are Not Equal: Using Weights in Social Graphs to Improve Search", Computer Science Department, Stanford University, Stanford, CA, Jul. 25, 2010, 7 pages.

* cited by examiner

*Primary Examiner* — Jae Y Lee
(74) *Attorney, Agent, or Firm* — Patent Portfolio Builders, PLLC

(57) ABSTRACT

A method for identifying influence paths in a communication network comprising a plurality of users is disclosed. The method comprises identifying network parameters indicative of a strength of connection between users of the network, combining the identified parameters to calculate a connection strength between users of the network, storing the calculated connection strengths as edge weights between the users of the network, identifying a source user and a target user for a path, and calculating a path between the source user and the target user according to the stored edge weights. Also disclosed is a method for compression of a network and a network element and computer readable medium.

21 Claims, 6 Drawing Sheets

IDENTIFYING INFLUENCE PATHS IN A COMMUNICATION NETWORK

TECHNICAL FIELD

The present invention relates to a method, network element and computer readable medium for identifying influence paths in a communication network comprising a plurality of users.

BACKGROUND

Communication networks are widely used across many industries and sections of society. Such networks may include, for example, telecommunications networks, social media networks, office networks, academia networks and community networks. The use of communication networks is growing, with continual expansion of customer bases driving business growth in this sector.

Connections between users within a communication network may give rise to paths through the network, by which a user may be placed into contact with another user with whom they are have no direct connection. Network operators frequently attempt to identify such paths based on their global view of the connectivity of the network. Such paths may be sought with a view to introducing second or third hand connections to each other and so increasing the density and utility of the network. Various methods exist for identifying paths among network users, which methods may prioritise either path length or connection strength. For example, in some network configurations or situations, identifying the shortest path between a first and a second user may be important, and such a path may be identified by reflecting user connectivity on a network graph and applying a shortest path algorithm to find the shortest path between the first and second users. Examples of shortest path algorithms include Dijkstra's algorithm, the Bellman Ford algorithm and Johnson's algorithm. In other situations, a greater importance may be placed upon the strength of connection between users in the path, prioritising a longer path in which each hop is between strongly connected users over a shorter path in which one or more hops is between users sharing only a very loose connection.

Information propagation is one example application in which a strongest path may be preferred over a shortest path. In a situation in which a source user wishes to propagate a request or piece of information to a target user with whom they have no direct connection, the likelihood of each member of the path passing the information or request along is of prime importance. In such cases, the success of the path is more dependent on the strength of the individual hops than the overall path length. The nature of the communication network in which a path is sought may also have an impact upon the most appropriate method for path identification. For example, the number of options for a path between two users may be greatly reduced in a sparse network compared to a dense network. On the other hand, connection strength in a dense network may vary widely, greatly impacting the likelihood of any particular path fulfilling its purpose.

The wide range of factors which may affect path selection and identification, together with the variety in communication network configuration and the different purposes for which a network operator may wish to identify a path, have led to the development of a wide range of different techniques, optimised for particular circumstances. In such a rapidly evolving domain, these highly tailored solutions may be overtaken by developments, as new measures of user connection, and new uses and applications for communication networks are considered.

SUMMARY

It is an aim of the present invention to provide a method, apparatus and computer readable medium which at least partially address one or more of the challenges discussed above.

According to a first aspect of the present invention, there is provided a method for identifying influence paths in a communication network comprising a plurality of users. The method comprises identifying network parameters indicative of a strength of connection between users of the network, combining the identified parameters to calculate a connection strength between users of the network, storing the calculated connection strengths as edge weights between the users of the network, identifying a source user and a target user for a path, and calculating a path between the source user and the target user according to the stored edge weights.

In some examples, the method may be conducted in a management element of the network. In further examples, the method may be conducted by a network operator of the network. In some examples, the calculated connection strengths may be directional, such that connection strength A to B may be different to connection strength B to A. In this manner, asymmetry in user connections may be modelled. In further examples, connection strength may be calculated between a user and each other user to which the user is connected, and the path may be calculated using a path finding algorithm. In further examples, the calculation of connection strengths may be periodically updated based on updated identified parameters.

In some example embodiments, at least one of the identified parameters may be a parameter global to the network, and at least one of the identified parameters may be a parameter local to a user. In this manner, insight from both local and global parameters may be leveraged in identifying a path from the source user to the target user. A user's local network may include all users within n connections of the user, where n may be set by a network operator according to the density of the network or requirements for data processing. Local parameters may thus be parameters pertaining to the local network of a user.

In some example embodiments, identifying a source user and a target user may comprise receiving a path request from a requesting entity, the path request specifying a source user and a target user characteristic, and identifying a target user for the path request according to the target user characteristic.

In some examples, a requesting entity may for example be a network user making a request via an application running on their phone or other connected device. In this manner, a user may benefit from the global network view available to a network operator or management entity to identify a path. The path may identified on the basis of connection strength which may be assessed on a global level and the path may then be made available to an individual user, who otherwise would be forced to start a path based only on their local network knowledge, without the benefit of the global perspective enjoyed by network management or operation entities. In some examples, the path request may be received from the source user for the requested path, in which case the specification of source user in the request may be provided by the identity of the requesting entity. The target user characteristic may comprise a target user identifier or may comprise some other user characteristic, in which case identifying a target user may comprise identifying all users having the target user characteristic and selecting one or more target users from among the identified users. This may be the case for example where a source user seeks a connection with a person employed at a certain company or having certain qualifications, connections or other characteristics useful to the source user.

In some examples, the calculated path may be communicated to the requesting entity, enabling the requester to act upon the information, for example by contacting the first user in the returned path if the requester is the source user for the path.

In some example embodiments, the path request may further specify a path subject matter, and the method may further comprise identifying an interest profile corresponding to the path subject matter and, for at least a subset of the connections, updating the stored edge weight by combining the calculated connection strength with a measure of the extent to which the users of the connection demonstrate the identified interest profile. In this manner, calculated connection strength may be updated on the basis of a correspondence between the subject matter of the request and the interests of the users who may potentially form a part of the path, so tailoring the connection strength on which path calculation is based to match the specific path request.

In some example embodiments, the method may further comprise identifying at least one community within the network, and calculating a connection strength between users of the network may comprise favouring connections between users of the same community. In this manner, intra community links may be prioritised while maintaining the underlying importance of connection strength, so adapting the method to suit networks which may comprise a plurality of comparatively dense communities scattered throughout a comparatively sparse overall network.

In some example embodiments, favouring connections between users of the same community may comprise applying a positive multiplier to calculated connection strengths for connections between users of the same community.

In some example embodiments, identifying network parameters indicative of a strength of connection between users of the network may comprise identifying network parameters indicative of user investment in another user. In some examples, user investment may be a time investment, for example in the form of call time, or may be investment of a different resource such as minutes from a call plan, data allowance, shared activity etc.

In some example embodiments, identifying network parameters indicative of a strength of connection between users of the network may comprise identifying at least one of: frequency of contact between users, recency of contact between users, reciprocity of contact between users, percentage of total user contact effected between users or user demographics. In different examples, each of these categories of parameter may include parameters which are global to the network or are local to the particular users concerned.

In some example embodiments, combining the identified parameters may comprise calculating an average of the values of the identified parameters for a connection. In some examples, the average may be a weighted average.

In some example embodiments, storing the calculated connection strengths as edge weights between users may comprise setting the reciprocal of the connection strength for a connection between two users as the edge weight between the two users. In such example embodiments, calculating a path between the source user and the target user according to the stored edge weights may comprise applying a shortest path algorithm.

In some example embodiments, the method may further comprise compressing the communication network according to influence, wherein calculating a path between the source user and the target user according to the stored edge weights comprises calculating a path using those users remaining in the compressed network. In such examples, influence may be calculated on the basis of the connection strength calculated according to the method.

In some example embodiments, compressing the communication network according to influence may comprise forming triads of users within the network having the same connection tie strength within a margin of error, identifying a single user present in at least a threshold number of the formed triads, and replacing the users of the formed triads with the identified user.

In some examples, triad formation and user replacement may be conducted multiple times to provide increasing levels of network compression.

According to another aspect of the present invention, there is provided a method for compressing a communication network comprising a plurality of users, the method comprising identifying network parameters indicative of a strength of connection between users of the network, combining the identified parameters to calculate a connection strength between users of the network, forming triads of users within the network having the same connection strength within a margin of error, identifying a single user present in at least a threshold number of the formed triads, and replacing the users of the formed triads with the identified user.

In some example embodiments, identifying network parameters indicative of a strength of connection between users of the network may comprise identifying network parameters indicative of user investment in another user.

In some example embodiments, identifying network parameters indicative of a strength of connection between users of the network may comprise identifying at least one of frequency of contact between users, recency of contact between users, reciprocity of contact between users, percentage of total user contact effected between users or user demographics.

In some example embodiments, combining the identified parameters may comprise calculating an average of the values of the identified parameters for a connection.

According to another aspect of the present invention, there is provided a network element configured for identifying influence paths in a communication network comprising a plurality of users, the network element comprising a processor and a memory, the memory containing instructions executable by the processor whereby the network element is operative to identify network parameters indicative of a strength of connection between users of the network, combine the identified parameters to calculate a connection strength between users of the network, store the calculated connection strengths as edge weights between the users of the network, identify a source user and a target user for a path, and calculate a path between the source user and the target user according to the stored edge weights.

In some example embodiments, the network element may be further operative to identify at least one community within the network, and wherein calculating a connection strength between users of the network comprises favouring connections between users of the same community.

In some example embodiments, the network element may be further operative to compress the communication network according to influence, and calculating a path between the source user and the target user according to the stored edge weights may comprise calculating a path using those users remaining in the compressed network.

According to another aspect of the present invention, there is provided a non-transitory computer readable medium containing program instructions for identifying influence paths in a communication network comprising a plurality of users, wherein execution of the program instructions by one or more processors of a computer causes the one or more processors to carry out the steps of identifying network parameters indicative of a strength of connection between users of the network, combining the identified parameters to calculate a connection strength between users of the network, storing the calculated connection strengths as edge weights between the users of the network, identifying a source user and a target user for a path and calculating a path between the source user and the target user according to the stored edge weights.

For the purposes of the present disclosure, a non-transitory computer readable medium encompasses within its scope all computer readable media with the sole exception of a transitory propagating signal per se.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
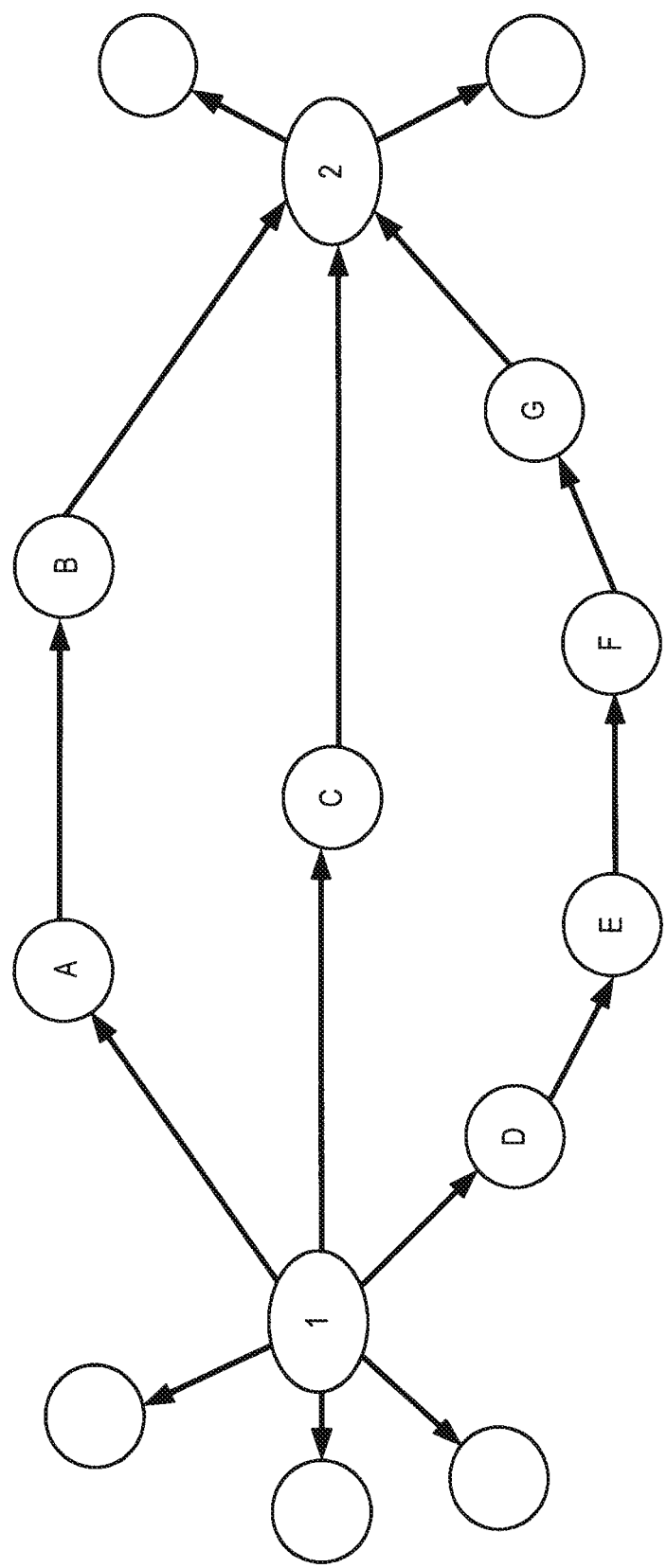
FIG. 1 illustrates a part of a network with different paths between two nodes.

In the following description, for purposes of explanation, specific details are set forth including particular architectures, processes and techniques in order to provide a thorough understanding of aspects of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the present disclosure and are included within its spirit and scope. In some instances, detailed descriptions of well-known devices, circuits, and methods are omitted so as not to obscure the description of aspects of the present invention with unnecessary detail. All statements herein reciting principles, aspects, and embodiments of the invention, as well as specific examples thereof, are intended to encompass both structural and functional equivalents thereof.

Thus, for example, it will be appreciated by those skilled in the art that block diagrams referred to in the present disclosure may represent conceptual views of circuitry or other functional units embodying the principles of the technology. Similarly, it will be appreciated that any flow charts referred to represent various processes which may be substantially represented in a computer readable medium and executed by a computer or processor, whether or not such computer or processor is explicitly shown. The functions of various elements including functional blocks, such as those labeled or described as "computer", "processor" or "controller", may be provided through the use of hardware such as circuit hardware and/or hardware capable of executing software in the form of coded instructions stored on computer readable media. Thus, such functions and illustrated functional blocks are to be understood as being hardware-implemented and/or computer-implemented, and thus machine-implemented.

In terms of hardware implementation, the functional blocks may include or encompass, without limitation, digital signal processor (DSP) hardware, reduced instruction set processor, hardware, e.g., digital or analog, circuitry including but not limited to application specific integrated circuit(s) (ASIC), and, where appropriate, state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 illustrates a part of a network with users 1, 2 and A to G. In order to increase network density, it may be that the operator of the network illustrated in FIG. 1 seeks paths between users via which a user may be introduced to another user with whom they do not yet have any direct network connection. It may also be envisaged that one of the users within the network seeks a path to enable connection with another of the users in the network. Referring to FIG. 1, in an example, it may be assumed that user 1 wishes to make a connection with user 2. As illustrated, there are three paths via which user 1 may be connected to user 2:

Path 1: 1-A-B-2
Path 2: 1-C-2
Path 3: 1-D-E-F-G-2

The shortest path from 1 to 2 is Path 2, encompassing a single intermediary, C, and involving only two connections, from 1 to C and from C to 2. It some situations, this shortest path may be sufficient. However, in other situations, user 1 may be less concerned about the length of the path than about the strength of the connections in the path. For example, should user 1 be a sales officer for a first company, and user 2 a purchasing officer at a potential new client for the first company, user 1 may seek an introduction to user 2 via a route that will enable user 1 to exert the greatest influence over user 2. Such a route may be identified by quantifying the influence which may be exerted via each possible route, and then selecting the route having the greatest influence value.

One way of quantifying influence that may be exerted via a route is to find a quantitative representation of the influence that each upstream user may exert on its downstream neighbour in the path, and then to combine those representations to generate a representation for the influence exerted over the entire path. The influence that one user may exert on another user may be approximated by a representation of the directional strength of the connection between the users. This may be quantified by considering the investment that one user of a connection makes in the other user of the connection. A process for calculating the directional strength of connections is discussed in further detail with respect to FIG. 2. Referring again to FIG. 1, a directional connection strength score, or influence score may be generated as discussed below for each of the connections in each of the three potential paths between users 1 and 2. The calculated influence scores may be combined to provide an influence score for the entire path by multiplying the individual connection strengths of a path together. Thus:

Influence Score
Path1=Influence(1,A)*Influence(A,B)*Influence(B,2)

Influence Score Path2=Influence(1,C)*Influence(C,2)

Influence Score Path3=Influence(1,D)*Influence(D,E)*Influence(E,F)*Influence(F,G)*Influence(G,2)

More generally:

Influence Score Path $R=\Pi$Influence$(i,j)$, where $(i,j)$ is a pair of consecutive nodes in path $R$.

Having calculated the influence scores for the various possible paths, the aim is to find the path having the highest value of Π Influence (i, j). This objective may be translated into minimizing:

log(ΠInfluence$(i,j)$)

which may be considered as minimising:

−log(ΠInfluence$(i,j)$)

or minimising:

$$\sum \log\left(\frac{1}{\text{Influence}(i,\ j)}\right)$$

Finding a route with maximum influence score, or minimum value of:

$$\sum \log\left(\frac{1}{\text{Influence}(i,\ j)}\right)$$

may be achieved by setting $$\frac{1}{\text{Influence}(i,\ j)}$$

as edge weights of the connections (i, j) and running any shortest path algorithm on the network on the basis of the assigned edge weights.

Figure 2:
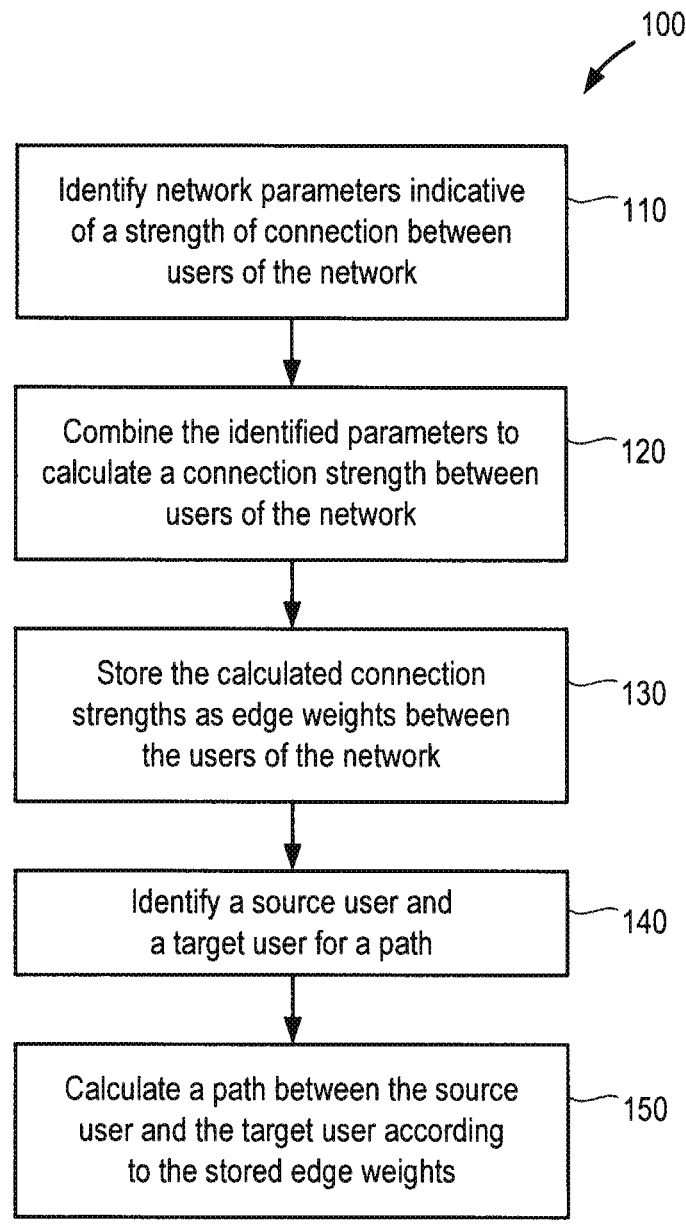
FIG. 2 is a flow chart illustrating process steps in a method for identifying influence paths in a communication network.

FIG. 2 illustrates process steps in a method 100 for identifying influence paths in a communication network.

Referring to FIG. 2, in a first step 110, the method 100 comprises identifying network parameters indicative of a strength of connection between users of the network. As discussed above, connection strength may be indicated by the investment that one user makes in another. A first parameter which may be identified as indicative of connection strength is frequency of contact between users. For a connection between user i and user j, frequency (i, j) may be calculated as the frequency with which i initiates contact with j over the connection, and frequency (j, i) may be calculated as the frequency with which j initiates contact with i over the connection. Another parameter which may be identified as indicative of connection strength is recency of contact between users, indicating how recently contact has been initiated between the users. Thus recency (i, j) may be calculated as the recency with which i has initiated contact with j over the connection, and recency (j, i) may be calculated as the recency with which j has initiated contact with i over the connection.

A third parameter which may be identified as indicative of connection strength is reciprocity of connection between users. This may place a numeric value on the degree to which a connection between two users is reciprocal, with contact being initiated by both users. The numeric value may be between 0 and 1, with values approaching 1 indicating a high degree of reciprocity in the connection, with initiation of contact roughly even between users i and j, and numbers approaching 0 indicating a low degree of reciprocity, with one party initiating contact and the other partly rarely if ever initiating contact. For all parameters it will be appreciated that "contact" is to be interpreted broadly and may take on different meanings depending upon the different ways that users may be connected and interact within any given communication network. A fourth parameter which may be identified as indicative of connection strength is percentage of total user contact effected between users. This may be calculated by dividing a value for initiated contacts from i to j by a value for the total number of initiated contacts from i to users with whom i is connected. In networks where contact may be conducted in different ways, individual ratios for different contact methods may be calculated and combined to give a single aggregate figure. Taking the example of a mobile telecommunication network, contact between users may include calls made, messages sent, data exchanged etc. In social networks, contact may include wall posts, messages, shares, re-tweets etc. For each contact method, the proportion of user is total contact investment that is directed towards user j may be calculated. The ratios may then be averaged, for example as a weighted average in order to place greater importance on measures considered to be more strongly indicative of connection strength. Thus if a user i has very limited resource for data sharing, and directs a high percentage of that resource towards a single user j, this could indicate a very high investment by i in j, and hence strong influence wielded by j over i.

Another parameter which may be identified as indicative of connection strength is user demographics. User demographics may include a wide range of user characteristics including age bracket, gender, place of birth or residence, education, educational or other institutions attended, employment situation, employer etc. Taking the example of educational institutions attended, shared attendance of a school or college may indicate an increased connection strength compared with users who have not attended the same school or college.

Referring again to FIG. 2, after identifying parameters indicative of a strength of connection between users in a network, the method proceeds to step 120, in which the identified parameters are combined to calculate a connection strength between users of the network. The directional connection strength of a connection (i, j) may be calculated as a function of the values for the different identified parameters indicative of connection strength from i to j:

Influence$(i,j) = \Psi(a_1, a_2, a_3, a_4 \ldots a_n)$ where $a_x$ are values for identified parameters for the connection $i$ to $j$.

One option for the function is an average, which may be weighted. Thus for example if two parameters have been identified in step 110, and the values for those parameters with respect to the connection (i, j) are $a_1$ and $a_2$, the connection strength may be calculated as:

Connection strength$(i,j) = 0.5(\alpha a_1 + \beta a_2)$ where $\alpha$ and $\beta$ are weighting factors.

Having calculated connection strengths in step 120, the method proceeds to step 130, in which the calculated connection strengths are stored as edge weights between the users of the network. As discussed above, the connection strength may be considered as indicative of influence, and the reciprocal of the influence may be set as the directional edge weight for a connection, enabling the use of shortest path algorithms to find a high influence path.

The method then proceeds to step 140, in which a source node and a target node are identified for a path to be calculated. In one example, a source node and a target node may be selected by a network operator, for example if the network operator seeks to make additional connections in the network. In another example the source node and target node may be identified in a path request received from a requesting entity. The requesting entity may for example be a user of the network seeking a connection to another user of the network. At step 140, the method comprises identifying the source and target users for the path, either from network operator information or by extracting the source and target users from a path request.

Finally, at step 150, the method 100 comprises calculating a path between the source user and the target user according to the stored edge weights. As discussed above, this may comprise applying a shortest path algorithm on the basis of the edge weights.

The method 100 of FIG. 2 may be conducted by a network operator and may enable a network operator to offer a service to users of the network in which the global perspective of the network operator is leveraged in service of individual users, enabling users to request a highly influential path to another user within the network based not only on their local knowledge of their own connections but on the global network view available to a network operator.

Figure 3:
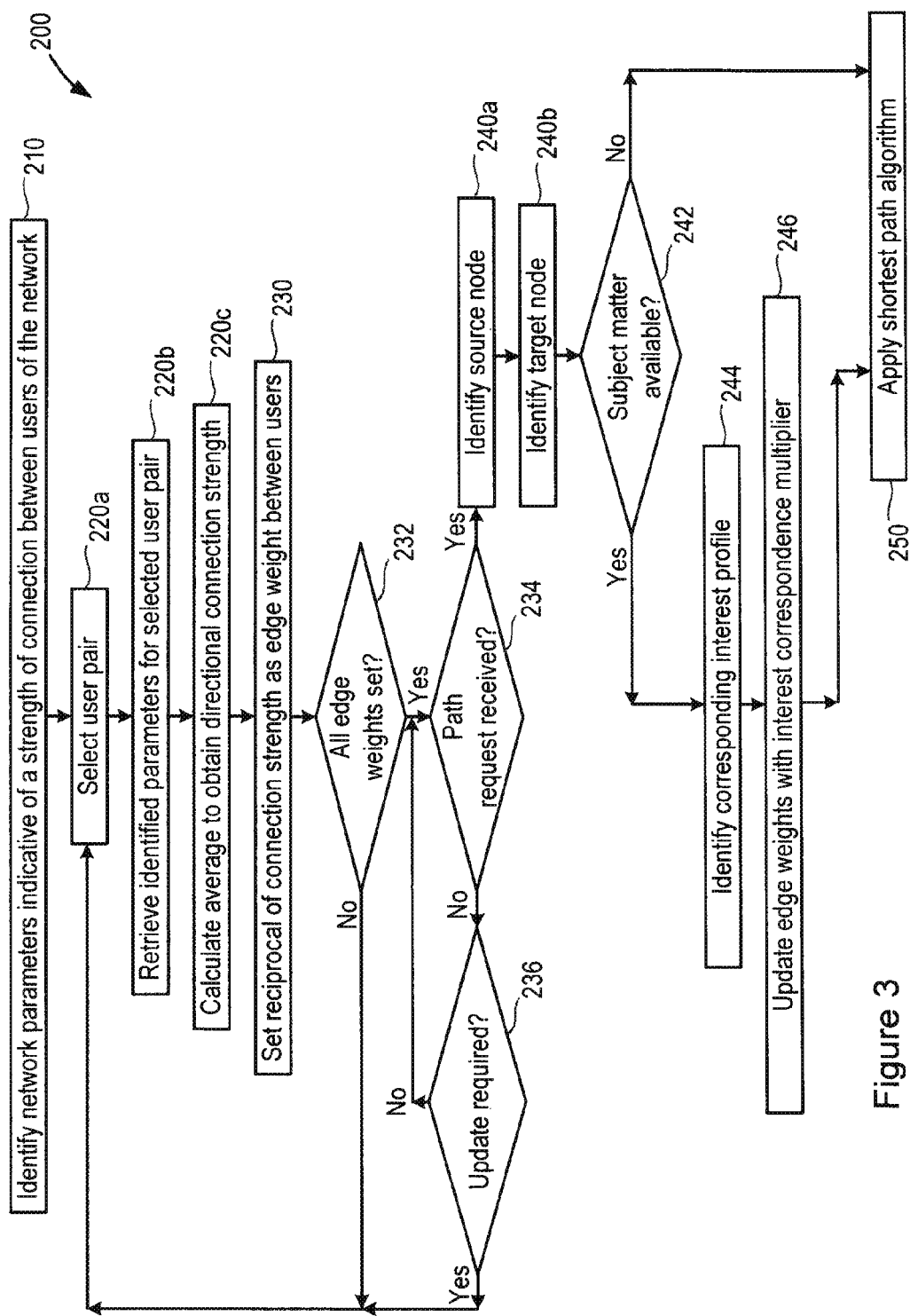
FIG. 3 is a flow chart illustrating an example of how the process steps of FIG. 2 may be further subdivided to achieve the illustrated functionality.

FIG. 3 illustrates a method 200, which provides one example of how some of the steps of the method 100 may be further subdivided to provide the described functionality. The method 200 also includes optional additional steps which may enhance the method 100.

Referring to FIG. 3, in a first step 210, the method 200 comprises identifying network parameters indicative of a strength of connection between users of the network. As discussed above, such parameters may include, inter alia, frequency, recency and reciprocity of contact and may also include percentage of total contact directed over the connection and/or user demographics. Having identified parameters, the method 200 then comprises, at step 220a, selecting a first user pair for analysis before, at step 220b retrieving values for the identified parameters for the selected pair. An average is then calculated as discussed above with respect to FIG. 2 to arrive at a directional connection strength for the pair in step 220c. The reciprocal of this connection strength is then set as the edge weight for the pair in step 230. This edge weight may be stored in a graph database such as, for example, Neo4j. The method then proceeds at step 232 to check whether all edge weights in the network have been set. If not all edge weights have been set, the method returns to step 220a to select a new pair and continues to select pairs, calculate connection strength and set edge weights until all edge weights in the network have been set. Once all edge weights have been set (Yes at step 232), the method then proceeds to check, at step 234, whether a path request has been received. If no path request has been received then the method checks whether an update of connection strength is required at step 236. Periodic update of connection strengths may be appropriate in order to reflect evolution in the contact between network users. If an update is required then the method returns to step 220a to select a first pair of users and proceeds to retrieve parameter values, calculate connection strength and set edge weights until all edge weights have been updated. If an update is not required, the method returns to step 234 to check for receipt of a path request.

As discussed above, a path request may be received from a network user for example via an application running on the phone or other connected device of the user. Once a path request is received, the method proceeds, at step 240a, to identify the source node for the path request. In the example of a user originating path request, the source user is likely to be the user requesting the path but it may be that another source user is identified in the path request. After identifying the source user for the requested path, the method then proceeds, at step 240b, to identify the target node for the request. The target node may be specified by a node identity in the request, or may be specified via some other characteristic. Taking the example of a professional social network, a user may seek an introduction to a particular person, in which case they may designate that person as the target node. Alternatively, a user may seek an introduction to a person holding a particular position in a target company, or having a certain combination of skills and experience. The path request may thus specify certain characteristics required of the target node without specifying a unique individual identifier. In such examples, identifying the target node may comprise searching for users who fulfill the specified criteria from the path request. If multiple users satisfy the specified criteria then the method may comprise selecting one of the appropriate users, or may calculate paths to all of the possible target users and select for the final target user the user reached by the highest influence path.

After identifying the source and target users for the path, the method may then proceed, at step 242 to check whether an indication of subject matter for the path request is available. It may be that users are more likely to pass along some requests or information than others. By identifying the subject matter of the request, and investigating to what extent that subject matter matches the interests of users in potential paths for the request, it may be possible to increase the likelihood of a path being successful, and the request or information being passed along the full length of the path. An indication of subject matter for the request may include an indication of the subject matter for information to be passed along the path, the nature of an invitation or the purpose of an introduction request. If a subject matter for the path request is available (Yes at step 242), the method then proceeds, at step 244 to identify an interest profile or profiles corresponding to the subject matter. For example, user profiles for users within the network may include a significant amount of information on user likes, interests, past activities, browsing history, preferences etc. It may be possible to associate the subject matter of the path request to an interest profile that may be stored for different users. For example if the subject matter of the request concerns football, then user profiles including a preference for football, a history of attending football matches or browsing internet content concerning football might be identified as a corresponding interest profile. Having identified a corresponding interest profile, the method may then proceed, at step 246 to update edge weights with a multiplier indicating the extent to which the user interest profile of the users in the connection matches the subject matter of the request. In this manner, connections in which users share an interest relating to the subject matter of the request may be prioritized over similar strength connections in which users do not share an interest relating to the subject matter of the request.

Following the updating of edge weights, or if subject matter for the path request is not available, the method then proceeds, at step 250 to apply a shortest path algorithm to calculate the highest influence path to the target user. The resulting path may then be communicated to the requesting party, enabling the source user to implement the path by contacting the first user in the path.

The path may be communicated to the requesting party in any suitable format. For example, if requested by a user via an application running on the user's phone or tablet, the path may be communicated via a graphic illustrating the path as connections between network users. The person who is the first connection of the path may be fully represented to the requesting user, as this will be one of the user's connections in their own local network and will enable the user to start to implement the path. Other users in the path may be more or less fully represented to the requesting user depending upon privacy restrictions. In another example, the path may be communicated to the user in the form of an indication of the first step in the path and a link to a website on which the path is represented, which link may be passed along the path. Protection may be placed on the website such that each user accessing the link sees only their part of the path, so protecting the privacy of individual users.

Figure 4:
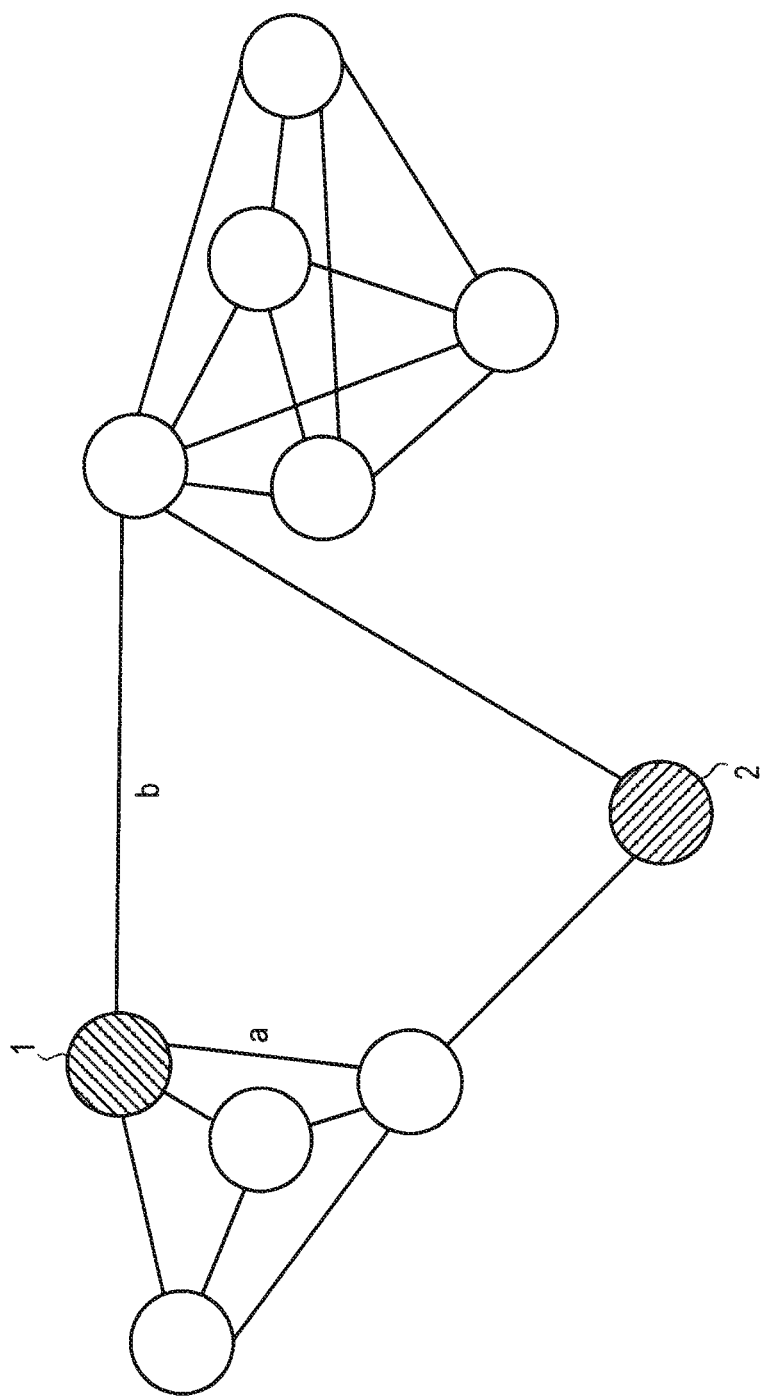
FIG. 4 illustrates part of a network having two communities.

As discussed above, networks are often categorized as sparse or dense networks. However, certain kinds of networks have a topology which is neither entirely dense nor entirely sparse but is comprised of a plurality of relatively dense communities scattered within a relatively sparse overall network. This topology is frequently found in telecommunication networks, and an example fraction of such a network is illustrated in FIG. 4. The illustrated fraction of telecommunication network comprises two relatively densely connected communities with only a single direct connection b between them, and further comprises a node 2 which has connections to both communities but is not comprised within either community. The connections between members of the same community tend in general to be stronger than those between members of different communities, although this may not necessarily be reflected in the parameters discussed above such as frequency of contact, reciprocity etc. Intra community connections are generally to be favored therefore when seeking a high influence path to a target user. In order to reflect the desirability of favoring intra community links, a community multiplier γ may be applied to all intra community links when calculating connection strength, for example at step 120 of method 100 or step 220c of method 200. The multiplier γ may cause the connection strength to which it is applied to be increased. Taking the example shown in FIG. 4, if a path from node 1 to node 2 is required, two potential two step paths can be seen to be available. The first option path involves intra community connection a and the second option path involves inter community connection b. Both paths then require an inter community hop to reach the target node 2. The first option path is preferable to the second option path, as this path takes advantage of an intra community connection, minimizing the number of inter community connections required to reach the target. Applying the positive multiplier γ to the connection strength or influence score of the connection a will have the effect of increasing the influence score, and so reducing the reciprocal of the influence score which is set as the edge weight for the connection. When a shortest path algorithm is applied on the basis of the edge weights, the connection a will be preferred to the connection b owing to the reduced edge weight. The community multiplier γ thus enables the methods 100, 200 to take account of network topologies which include communities, and to reflect the closer ties and hence the increased effectiveness of connections between members of the same community.

Figure 5:
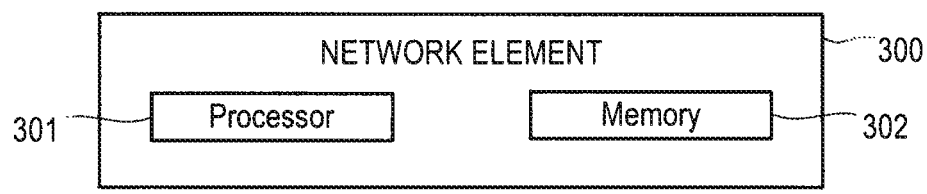
FIG. 5 is a block diagram illustrating functional units in a network element.

As discussed above, the methods 100, 200 may be conducted by a network element within a network operator domain, for example receiving path requests from users running a dedicated path finding application. Apparatus for conducting the methods 100, 200, for example on receipt of suitable computer readable instructions, which may be embodied within a computer program, may be incorporated within a network element. FIG. 5 illustrates functional units in a network element 300 which may execute the steps of the methods 100, 200, for example according to computer readable instructions received from a computer program. It will be understood that the units illustrated in FIG. 5 are functional units, and may be realised in any appropriate combination of hardware and/or software.

Referring to FIG. 5, the network element 300 comprises a processor 301 and a memory 302. The memory 302 contains instructions executable by the processor 301 such that the network element 300 is operative to conduct the steps of the method 100 or the method 200.

The methods 100 and 200 provide a mechanism by which global network operator perspective may be made available to individual users through the calculation of high influence paths from a source user to a target user. In this manner, users may make maximum use of their connections, exploiting possibilities for new connections, introductions and information passing of which they would not have been aware on the basis only of their knowledge of their local network formed from their direct connections. The paths calculated according to the methods are calculated on the basis of connection strengths, which may be calculated according to various parameters, and may be adjusted to prioritise certain connection types or to reflect the subject matter of a particular query. This represents an added service for network users which may provide a revenue stream for service providers and may also help network operators to maintain users within the network and to increase the interconnectivity of the network, thus rendering the network more productive.

The connection strengths calculated according to the methods 100 and 200 may also be used for the purpose of compressing a communication network. Taking the example of a telecommunication network, such networks are often vast, with many individual communities scattered through a relatively sparse overall network. When manipulating or analysing such a network, efficiencies may be achieved by compressing the network to a more manageable size.

Figure 6:
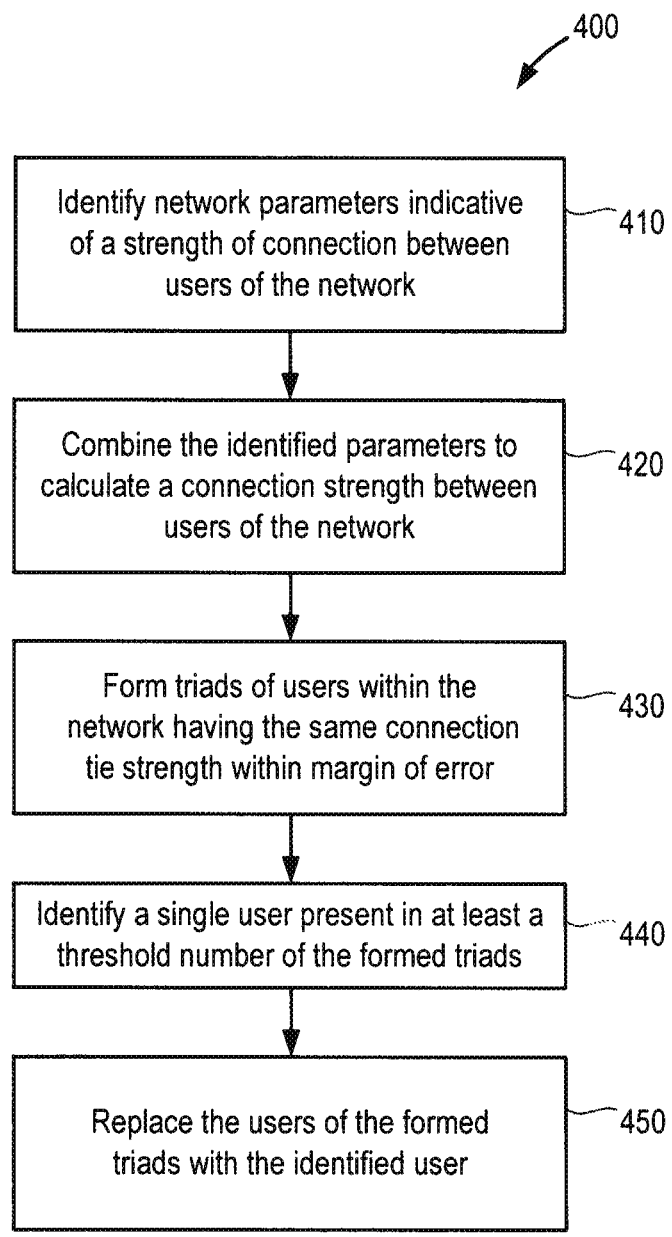
FIG. 6 is a flow chart illustrating process steps in a method for compressing a communication network.

According to aspects of the present invention, such compression may be achieved on the basis of connections strengths between users. FIG. 6 illustrates a method 400 for compressing a communication network comprising a plurality of users. In a first step 410, the method comprises identifying network parameters indicative of a strength of connection between users of the network. The method then comprises, at step 420, combining the identified parameters to calculate a connection strength between users of the network. These first two steps may be conducted as described above with respect to the methods 100 and 200 of FIGS. 2 and 3. The method 400 then comprises, at step 430, forming triads of users within the network having the same connection strength within a margin of error. A triad is a formation of three users within the network, and according to the present method, triads are formed on the basis of connection strengths, linking three users into a triad who have approximately the same connection strengths. The method then comprises, at step 440, identifying a single user present in at least a threshold number of the formed triads, and, at step 450, replacing the users of the formed triads with the identified user. In this manner, a plurality of users is replaced with a single user who has a high probability of being a local influencer amongst those users they represent. The steps of forming triads, identifying a common user and replacing the users of the triads with the identified user may be repeated multiple times in order to achieve a desired degree of compression of the network. The method 400 thus achieves a compression of a network to facilitate network manipulation and analysis while maintaining the quality of the information within the network, preserving the key influential users within the network. Such users are likely to the most useful to the network in terms of identifying paths for new connections or passage of data, or for any other network manipulation that may be attempted. The method 400 may be carried out before applying the methods 100, 200 in order to render the process of path identification more efficient. The method 400 may also be applied before other kinds of network analysis or manipulation.

As for the methods 100, 200, the method 400 may be conducted by a network element within a network operator domain. Apparatus for conducting the method 400, for example on receipt of suitable computer readable instructions, which may be embodied within a computer program, may be incorporated within a network element such as the network element illustrated in FIG. 5.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for identifying influence paths in a communication network comprising a plurality of users, the method comprising:
    identifying network parameters indicative of strength of connections between users of the communication network;
    combining the identified parameters to calculate connection strengths between users of the communication network;
    identifying at least one community within the communication network, wherein calculating connection strengths between users of the communication network comprises favouring intra-community connections over inter-community connections within the communication network;
    storing the calculated connection strengths as edge weights between the users of the communication network;
    identifying a source user and a target user for a path; and
    calculating a path between the source user and the target user according to the stored edge weights.

2. The method as claimed in claim 1, wherein at least one of the identified parameters is a parameter global to the communication network, and at least one of the identified parameters is a parameter local to a user.

3. The method as claimed in claim 1, wherein identifying the source user and the target user comprises:
    receiving a path request from a requesting entity, the path request specifying the source user and a target user characteristic; and
    identifying the target user for the path request according to the target user characteristic.

4. The method as claimed in claim 3, wherein the path request further specifies a path subject matter, the method further comprising:
    identifying an interest profile corresponding to the path subject matter; and
    for at least a subset of the connections, updating the stored edge weights by combining the calculated connection strengths with a measure of the extent to which the users of the connections demonstrate the identified interest profile.

5. The method as claimed in claim 1, wherein favouring intra-community connections over inter-community connections comprises applying a positive multiplier to calculated connection strengths for the intra-community connections.

6. The method as claimed in claim 1, wherein identifying network parameters indicative of strength of connections between users of the communication network comprises identifying network parameters indicative of user investment in another user.

7. The method as claimed in claim 1, wherein identifying network parameters indicative of strength of connections between users of the communication network comprises identifying at least one of:
    frequency of contact between users;
    recency of contact between users;
    reciprocity of contact between users;
    percentage of total user contact effected between users;
    user demographics.

8. The method as claimed in claim 1, wherein combining the identified parameters comprises calculating an average of the values of the identified parameters for a connection.

9. The method as claimed in claim 1, wherein storing the calculated connection strengths as edge weights between users comprises setting the reciprocal of the connection strength for a connection between two users as the edge weight between the two users.

10. The method as claimed in claim 9, wherein calculating a path between the source user and the target user according to the stored edge weights comprises applying a shortest path algorithm.

11. The method as claimed in claim 1, further comprising compressing the communication network according to influence, wherein calculating a path between the source user and the target user according to the stored edge weights comprises calculating a path using those users remaining in the compressed network.

12. The method as claimed in claim 11, wherein compressing the communication network according to influence comprises:
    forming triads of users within the communication network having the same connection strength within a margin of error;
    identifying a single user present in at least a threshold number of the formed triads; and
    replacing the users of the formed triads with the identified user.

13. A method for compressing a communication network comprising a plurality of users, the method comprising:
    identifying network parameters indicative of strength of connections between users of the communication network;
    combining the identified parameters to calculate connection strengths between users of the communication network;
    forming triads of users within the communication network having the same connection strength within a margin of error;
    identifying a single user present in at least a threshold number of the formed triads; and
    replacing the users of the formed triads with the identified user.

14. The method as claimed in claim 13, wherein identifying network parameters indicative of strength of connections between users of the communication network comprises identifying network parameters indicative of user investment in another user.

15. The method as claimed in claim 13, wherein identifying network parameters indicative of strength of connections between users of the communication network comprises identifying at least one of:
    frequency of contact between users;
    recency of contact between users;
    reciprocity of contact between users;
    percentage of total user contact effected between users;
    user demographics.

16. The method as claimed in claim 13, wherein combining the identified parameters comprises calculating an average of the values of the identified parameters for a connection.

17. The method of claim 13 further comprising:
    storing the calculated connection strengths as edge weights between users of the communication network;
    identifying influence paths, wherein the identifying comprises:
        identifying a source user and a target user for a path; and
        calculating a path between the source user and the target user, according to the stored edge weights, using those users remaining in the compressed network.

18. A network element configured for identifying influence paths in a communication network comprising a plurality of users, the network element comprising a processor and a memory, the memory containing instructions executable by the processor whereby the network element is operative to:
    identify network parameters indicative of strength of connections between users of the communication network;
    combine the identified parameters to calculate connection strengths between users of the communication network;
    identify at least one community within the communication network, and wherein calculating connection strengths between users of the communication network comprises favouring intra-community connections over inter-community connections;
    store the calculated connection strengths as edge weights between the users of the communication network;
    identify a source user and a target user for a path; and
    calculate a path between the source user and the target user according to the stored edge weights.

19. The network element as claimed in claim 18, wherein the network element is further operative to compress the communication network according to influence, and wherein calculating a path between the source user and the target user according to the stored edge weights comprises calculating a path using those users remaining in the compressed network.

20. A non-transitory computer readable medium containing program instructions for identifying influence paths in a communication network comprising a plurality of users, wherein execution of the program instructions by one or more processors of a computer causes the one or more processors to carry out the steps of:
    identifying network parameters indicative of strength of connections between users of the communication network;
    combining the identified parameters to calculate connection strengths between users of the communication network;
    identifying at least one community within the network, wherein calculating connection strengths between users of the communication network comprises favouring intra-community connections over inter-community connections;
    storing the calculated connection strengths as edge weights between the users of the communication network;
    identifying a source user and a target user for a path; and
    calculating a path between the source user and the target user according to the stored edge weights.

21. The non-transitory computer readable medium as claimed in claim 20, execution of the program instructions by one or more processors of a computer further causes the one or more processors to compress the communication network according to influence, wherein calculating a path between the source user and the target user according to the stored edge weights comprises calculating a path using those users remaining in the compressed network, further wherein compressing the communication network according to influence comprises:
    forming triads of users within the communication network having the same connection strength within a margin of error;
    identifying a single user present in at least a threshold number of the formed triads; and replacing the users of the formed triads with the identified user.

* * * * *